United States Patent
Kannan et al.

(10) Patent No.: US 9,619,430 B2
(45) Date of Patent: Apr. 11, 2017

(54) ACTIVE NON-VOLATILE MEMORY POST-PROCESSING

(75) Inventors: Sudarsun Kannan, Atlanta, GA (US); Dejan S. Milojicic, Palo Alto, CA (US); Vanish Talwar, Campbell, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1043 days.

(21) Appl. No.: 13/404,619

(22) Filed: Feb. 24, 2012

(65) Prior Publication Data

US 2013/0227194 A1  Aug. 29, 2013

(51) Int. Cl.
G06F 9/38 (2006.01)
G06F 15/163 (2006.01)
G06F 15/78 (2006.01)
G06F 3/06 (2006.01)
G06F 15/173 (2006.01)

(52) U.S. Cl.
CPC .......... *G06F 15/7821* (2013.01); *G06F 3/067* (2013.01); *G06F 9/3877* (2013.01); *G06F 15/173* (2013.01)

(58) Field of Classification Search
CPC .... G06F 12/0246; G06F 15/16; G06F 15/163; G06F 15/173; G06F 3/067
USPC .......................................................... 711/103
See application file for complete search history.

(56) References Cited

U.S. PATENT DOCUMENTS

| | | | |
|---|---|---|---|
| 4,543,630 A * | 9/1985 | Neches | 709/252 |
| 7,539,781 B1 | 5/2009 | Bali et al. | |
| 7,761,624 B2 | 7/2010 | Karamcheti et al. | |
| 7,877,471 B2 | 1/2011 | Bailey et al. | |
| 7,895,286 B1 | 2/2011 | Kilbourne, II et al. | |
| 2011/0219097 A1* | 9/2011 | Crockett | 709/219 |
| 2011/0231595 A1* | 9/2011 | Wakrat et al. | 711/103 |

OTHER PUBLICATIONS

Caulfield, A. et al.; "Moneta: a High-performance Storage Array Architecture for Next-generation, Non-volatile Memories"; http://mesl.ucsd.edu/joel/papers/moneta_micro10.pdf.

* cited by examiner

*Primary Examiner* — Edward Dudek, Jr.
*Assistant Examiner* — Andrew Russell
(74) *Attorney, Agent, or Firm* — Fabian VanCott

(57) ABSTRACT

A computing node includes an active Non-Volatile Random Access Memory (NVRAM) component which includes memory and a sub-processor component. The memory is to store data chunks received from a processor core, the data chunks comprising metadata indicating a type of post-processing to be performed on data within the data chunks. The sub-processor component is to perform post-processing of said data chunks based on said metadata.

20 Claims, 6 Drawing Sheets

600

With a computing node, store data chunks received from a processor core into a memory of an active NVRAM component, the data chunks comprising metadata indicating a type of post-processing to be performed on data within the data chunks
(block 602)

With a sub-processor element of the active NVRAM component, perform post processing on the data chunks based on the metadata
(block 604)

Fig. 6

ACTIVE NON-VOLATILE MEMORY POST-PROCESSING

STATEMENT OF GOVERNMENT INTEREST

This invention has been made with government support under Contract No. DE-SC0005026, awarded by The Department of Energy. The government has certain rights in the invention.

BACKGROUND

High Performance Computing (HPC) refers to large scale processing that is often performed by computer clusters. HPC is used to solve complicated problems that involve large amounts of data, often in the petabyte range. As the multiple nodes within the cluster process the data, the output is transferred over Input/Output (I/O) channels to be placed onto a large scale persistent data storage system such as a data warehouse. This data is often stored across several nodes.

Data staging refers to the process in which the movement of data is partly replaced with or supplemented by computations that perform post-processing of the data before moving it across I/O channels to persistent storage. Such post-processing is used to reformat, sort, or compress the data so that it is in a form suitable for more efficient access or data analytics. Due to the high volume of data undergoing post-processing, bottlenecks can occur in data staging process and I/O traffic between the processor and the storage systems.

BRIEF DESCRIPTION OF THE DRAWINGS

The accompanying drawings illustrate various examples of the principles described herein and are a part of the specification. The drawings are merely examples and do not limit the scope of the claims.

FIG. 6 is a diagram showing an illustrative method for post-processing with an active NVRAM memory component, according to one example of principles described herein.

Throughout the drawings, identical reference numbers designate similar, but not necessarily identical, elements.

DETAILED DESCRIPTION

As mentioned above, due to the high volume of data undergoing post-processing, bottlenecks can occur in data staging process and I/O traffic between the processor and the storage systems. In light of this and other issues, the present specification discloses methods and systems that perform post-processing in an efficient manner through use of active Non-Volatile Random Access Memory (NVRAM) components.

According to certain illustrative examples, an active NVRAM component includes a piece of non-volatile memory and a sub-processing unit designed specifically for performing post-processing of data. The application that runs on the main processing cores is designed to output data in chunks for placement into the memory component of the active NVRAM component. These chunks of data will include metadata. The metadata includes various pieces of information such as the state of the data, its memory location, its size, and particularly, what type of post-processing is to be performed on that data.

The active NVRAM component utilizes a queue to determine the order in which the data chunks are to be processed. This queue may be a global queue that indicates the order in which chunks are to be processed across multiple nodes. The application that places the data chunks into the NVRAM assigns an order identifier to the chunks. The sub-processing unit of the active NVRAM component looks at the queue and determines if the next chunk to be processed is within its corresponding memory component. If so, it will fetch that chunk and process it according to the metadata attached to that chunk.

Through use of methods and systems embodying principles described herein, the performance of I/O post-processing is increased. Specifically, use of the active NVRAM component relieves the main processing cores from the extra processing. Furthermore, the data is efficiently post-processed before being placed into a long-term persistent storage. Moreover, the active NVRAM provides an efficient checkpoint mechanism.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Throughout this specification and in the appended claims, the terms "software" or "firmware" refer to machine readable instructions.

Figure 1:
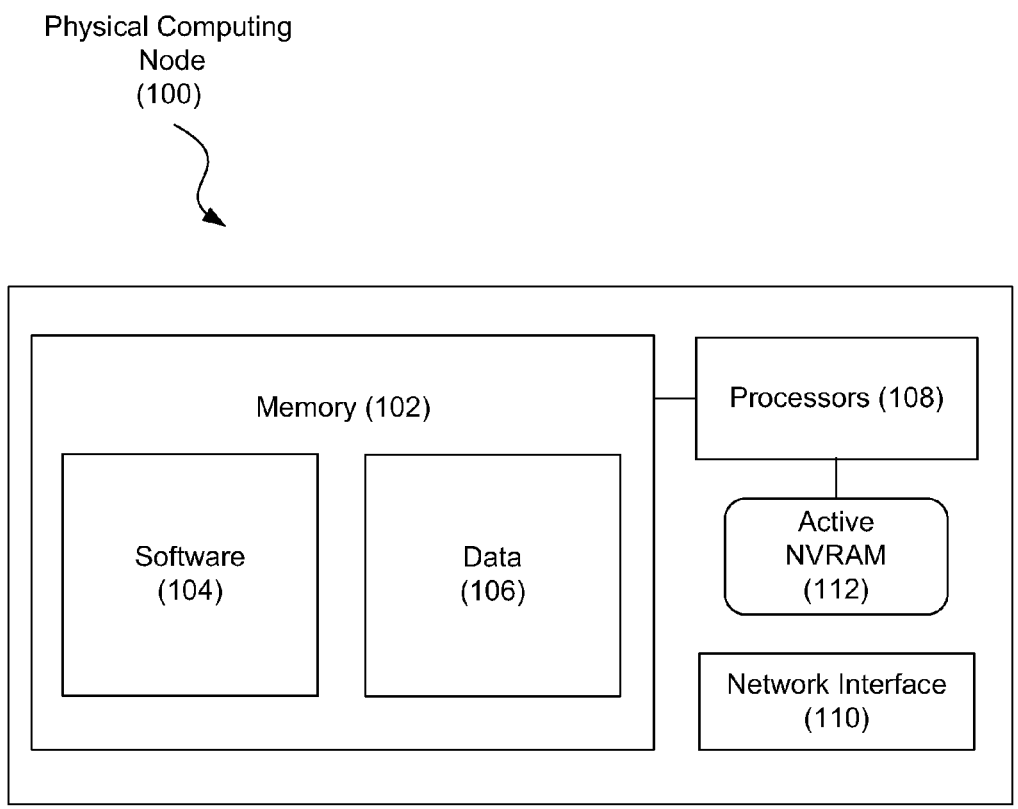
FIG. 1 is a diagram showing an illustrative physical computing node, according to one example of principles described herein.

Referring now to the figures, FIG. 1 is a diagram showing an illustrative physical computing node (100) that is one of many computing nodes in a high performance computing cluster. According to certain illustrative examples, the physical computing node (100) includes a memory (102) having software (104) and data (106) stored thereon. The physical computing node (100) also includes a number of processors or processor cores (108), an active NVRAM component and a network interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106). The memory (102) of the physical computing node (100) may be a temporary storage of processed data (106) before that data (106) is transferred to a long-term persistent storage system such as a data warehouse. A data warehouse stores large amounts of data that is formatted for reporting and analysis.

The physical computing node (100) also includes a number of processors or processor cores (108). These processors act in concert to perform high performance computations. Various parallel processing techniques can be used among the many processors. In general, processors are used for executing the software (104) and using or updating the data (106) stored in memory (102). The software (104) may include an operating system. An operating system allows other applications to interact properly with the hardware of the physical computing system. Such other applications may include a variety of high performance applications.

In some examples, the active NVRAM component (112) may be part of a module that is communicatively coupled to the processors or processor cores (108). The active NVRAM component (112) includes its own processing circuitry designed specifically for performing post-processing of data sent therein. Each of the processors or processor cores may send data to the active NVRAM for post-processing.

A network interface (110) may provide a manner for the computing node (100) to interact with other computing nodes and/or systems. Specifically, the network interface allows the computing node (100) to coordinate processing with other computing nodes and to transmit data to other locations for storage. Various transfer protocols may be used to transfer this data.

Figure 2:
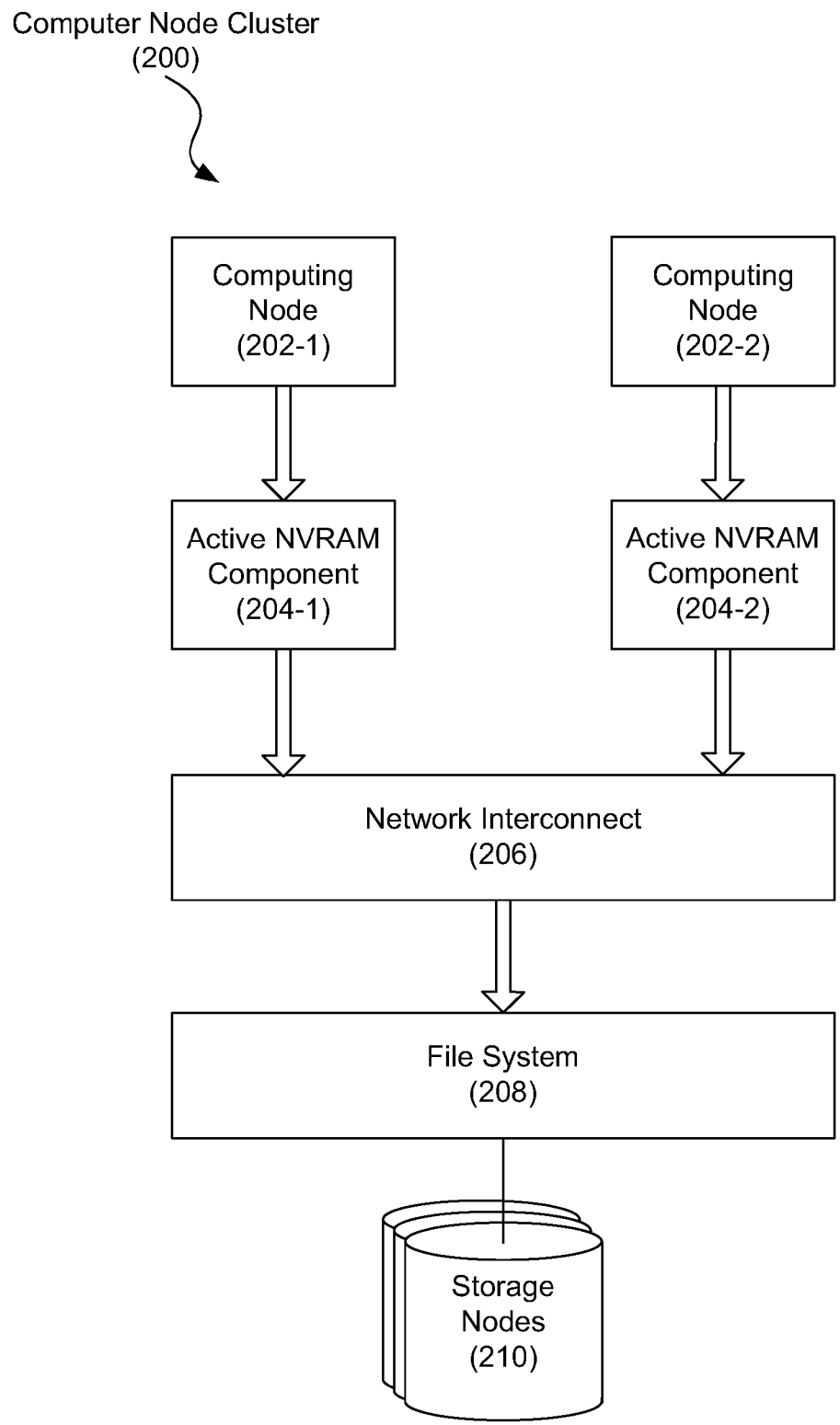
FIG. 2 is a diagram showing an illustrative computing node cluster, according to one example of principles described herein.

FIG. 2 is a diagram showing an illustrative computing node cluster (200). A computing node cluster (200) includes a number of computing nodes (202) that act in concert to perform various computing tasks. In this example, two different computing nodes and their respective active NVRAM components (204) are shown. However, a computing cluster embodying principles described herein may include a much larger number of computing nodes (202).

As mentioned above, the processor cores of the computing nodes (202) execute various high performance computing applications. These applications output data in chunks to their respective active NVRAM software components (204). The active NVRAM components (204) then perform post-processing of the data chunks.

The processor cores of the computing nodes interact according to a producer/consumer model. Specifically, the processor cores produce the data chunks. These data chunks are consumed by the active NVRAM. The processor cores can then continue their normal operations and no longer have any direct control over the data chunks. By not having the main processors perform the post-processing that is performed by the active NVRAM components (204), the processing nodes (202) are able to devote more time to processing the application itself.

After completing post-processing, the data is sent over a network interconnect (206) to a file system (208). A file system is a mechanism for storing data on non-volatile storage systems for later retrieval. The file system (208) for large scale high performance computing often stores data across multiple storage nodes (210). These storage nodes may be various hard disk drives or solid state drives.

Figure 3:
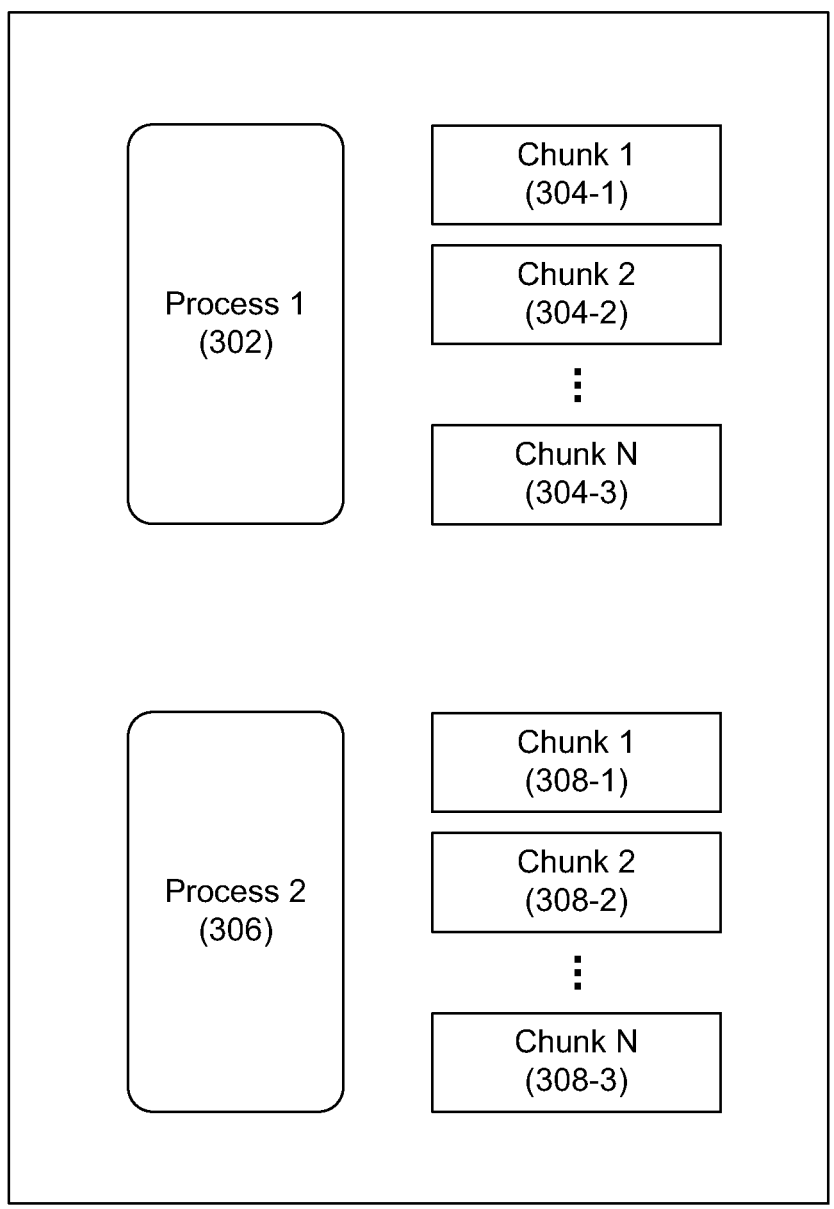
FIG. 3 is a diagram showing illustrative processes of a high performance computing application, according to one example of principles described herein.

FIG. 3 is a diagram showing illustrative processes of a high performance computing application (300). According to certain illustrative examples, computer applications operate using multiple processes. A process is an instance of a computer program that is being executed by the processor. Many operating systems and processors are designed to run multiple processes at the same time. A process is often made of several threads of execution. A thread is a unit of processing that is scheduled for execution on the processor by the operating system.

Each process (302, 306) creates a stream of data that is sent out for post-processing. This data can be divided up into chunks. In the example of FIG. 3, two processes are shown which are running on the same processor core. However, a practical application may have a much larger number of processes being executed by the processor. Process 1 (302) creates output data that is divided up into multiple chunks (304). Likewise, process 2 (306) creates output data that is divided into multiple chunks (308). These chunks can be divided such that they are suitable for post-processing by an active NVRAM component.

Figure 4:
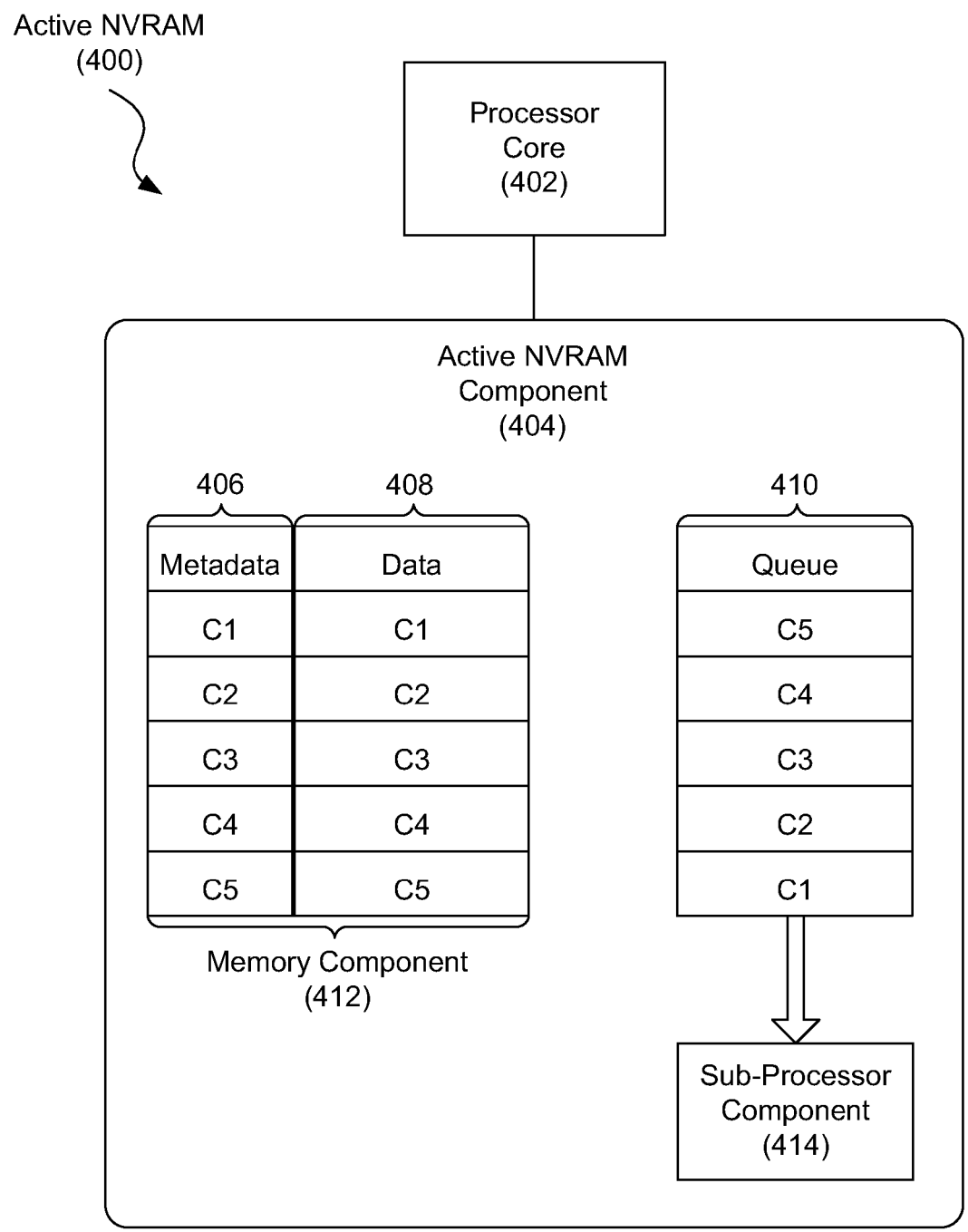
FIG. 4 is a diagram showing an illustrative active NVRAM component, according to one example of principles described herein.

FIG. 4 is a diagram showing an illustrative active NVRAM component (400). According to certain illustrative examples, the data which is divided into chunks by the processor core (402) is sent to the active NVRAM component (404). The data is placed within a non-volatile memory component (412) of that active NVRAM component. The application running on the processor is designed to use memory semantics rather than file semantics. This means that instead of writing output data to a file to be managed by a file system, the application allocates memory within the memory component (412) and places the data chunks within that allocated memory.

The memory component (412) is illustrated as two columns. The first column (406) is the metadata column. The second column is the actual data column (408). The metadata includes information about its associated data chunk. This information may include, but is not limited to, the physical address within the memory component at which the data chunk is stored, the size of the data chunk, the type of data within the data chunk, and the current state of that data, among others. Additionally, the metadata for each chunk indicates what type of post-processing is to be performed on the data within the chunk. For example, the metadata may indicate that the data is to be sorted, reformatted, or compressed. The metadata may also describe exactly how it is to be sorted or compressed. There are several ways in which data may be merged or compressed and different methods are often application specific.

In some cases, the active NVRAM may serve as a consumer to multiple processor cores. Thus, each processor core will write data to the active NVRAM. Various locking mechanisms can be used to ensure that there are no conflicts if multiple cores attempt to write to the active NVRAM component (404) simultaneously. Such locking mechanisms may include phase locks or spinlocks. Such locks place a processing thread in a loop until the lock is open (i.e., the active NVRAM is available). Such locking mechanisms are efficient when there is a high probability that the lock will be open. Because the active NVRAM is more likely than not to be open, the locking mechanism effectively prevents conflicts.

The post-processing itself is actually performed by a sub-processor component (414) within the active NVRAM component (404). This sub-processor component (414) may be a simpler processor than the main processor core (402). It may be designed for a subset of operations. For example, the sub-processor component (414) may be designed for a particular set of post-processing operations. The applications running on the main processor core (402) can then write instructions on what types of processes to perform on the data within the metadata of each chunk.

The order in which the sub-processor component (414) processes each data chunk from the memory component (412) is determined by a queue (410). When writing data chunks to the memory component (412) of the active NVRAM component (404), the process writing those chunks may also update the queue. The sub-processor component (414) can then look to the queue to determine which data chunk to process next. After determining which chunk is to be processed next, the sub-processor component (414) will then fetch that chunk from the memory component and apply the appropriate processing operations. The memory component can then be updated indicating that a particular data chunk stored therein has been processed.

In some cases, the active NVRAM component (404) is designed to process data chunks in concert with other active NVRAM components associated with different nodes. These nodes may be different processing cores within the same chip. Additionally or alternatively, these nodes may be from different computing nodes within a computing node cluster. Either way, the application that is being executed across these nodes may include within the metadata, an order identifier for each data chunk. The queue (410) may thus be a global queue accessible to all NVRAM components.

The order identifier indicates which chunk of data is to be processed next. The sub-processor component thus looks at the next data chunk to be processed and first determines if the data chunk to be processed is stored within its corresponding memory component (412). If the data chunk to be processed next is not stored within the corresponding memory component (412), then the sub-processor component does not have to perform any processing at this time. However, if the data chunk to be processed next is in fact stored within the corresponding memory component (412), then the sub-processor component (414) takes that chunk from memory and processes it according to the instructions within the metadata for that chunk.

The data chunk may be placed back into the active NVRAM after being processed by the sub-processed component. The metadata for that processed data chunk will then indicate that the data has been processed. Processed data can then be transferred asynchronously to the file system for long term storage.

With data being processed across several active NVRAM components, it is beneficial to maintain a balance of processing across those nodes. If one node is processing a disproportionate number of data chunks relative to the other nodes, then the performance will degrade. To balance the processing of data across multiple active NVRAM components, the order identifiers can be assigned to the chunks according to a balanced tree data structure. A data structure is a form of data representation. A tree data structure is one in which data is organized by a root node having a number of child nodes. Each of those child nodes also has child nodes.

One example of a balanced tree data structure is a red-black tree. A red-black tree is a type of binary tree and thus each node includes up to two child nodes. In a red-black tree, each node is also assigned a color attribute of either red or black. The root node is always black. The child nodes of black nodes are red and the child nodes of red nodes are black. The red-black tree is a self balancing tree. This means that an insertion of an additional node automatically rebalances the tree.

The order identifiers can be assigned such that they correspond with the order of nodes within a red black tree. The order in which nodes within the tree are processed, i.e. removed from the tree, is such that the tree rebalances itself after each removal and the properties of the tree hold. Thus, if the data chunks are processed in accordance with the ordering of the data tree structure, the processing of the nodes will be efficiently balanced.

Figure 5A:
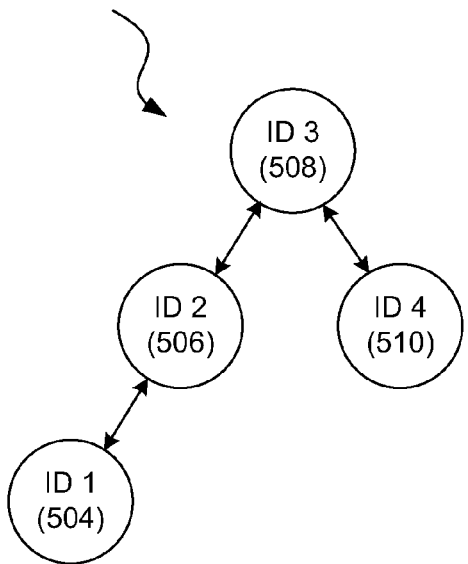
FIGS. 5A-5C are diagrams showing illustrative tree data structures used order post-processing of data across multiple nodes, according to one example of principles described herein.
Figure 5B:
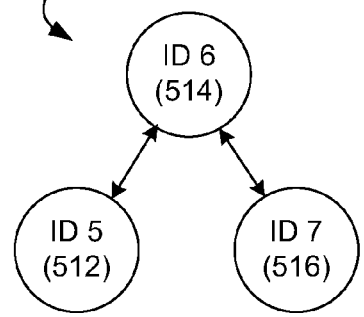
Figure 5C:
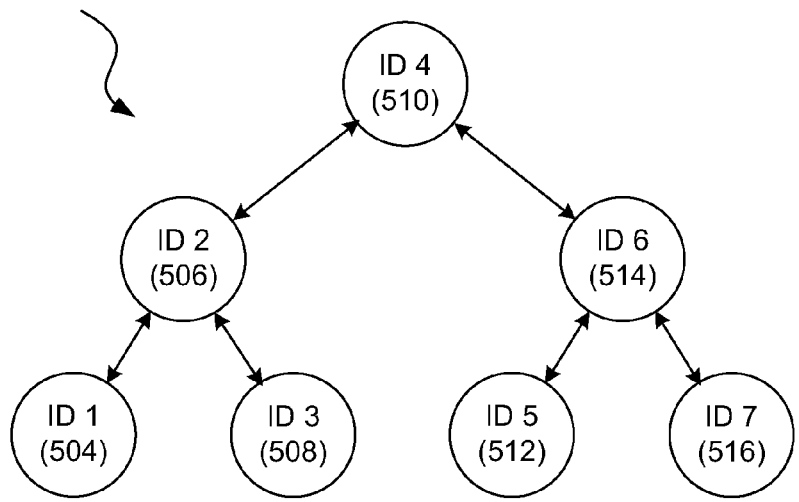

FIGS. 5A-5C are diagrams showing illustrative tree data structures used to order post-processing of data across multiple nodes. According to certain illustrative examples, each node may maintain a balanced tree of the data chunks within its corresponding active NVRAM memory component. FIG. 5A illustrates a tree (500) for the data chunks within node 1 while FIG. 5B illustrates a tree (520) for the data chunks within node 2.

Node 1 (500) includes data chunks being assigned order ID 1 (504), order ID 2, (506), order ID 3 (508), and order ID 4 (510). The order in which these chunks are to be processed is determined according to a red-black tree structure. This is referred to as the local sequence tree. Likewise, node 2 (520) includes data chunks being assigned order ID 5 (512), order ID 6 (514), and order ID 7 (516). This forms the local sequence tree for node 2 (520).

Each of the nodes will then send its local sequence tree to a central place to form a global sequence tree (530). The global sequence tree (530) is a merger of all the local sequence trees such that the constraints of the tree hold and the tree (530) are automatically balanced. The data chunks can then be processed in the order according to the global sequence tree. Thus, the global active queue can be designed to reflect the ordering of the global sequence tree (530).

Using active NVRAM components according to the above description provides a useful checkpoint mechanism. A checkpoint mechanism captures the state of an application and stores that state into memory for recovery in case of a system failure. Checkpoint mechanisms can consume a lot of processing time for high performance computing but are very helpful. Thus, the active NVRAM is especially helpful for speeding up checkpoint operations.

FIG. 6 is a diagram showing an illustrative method (600) for post-processing with an active NVRAM memory component. According to certain illustrative examples, the method includes, with a computing node, storing (block 602) data chunks received from a processor core into a memory of an active NVRAM component, the data chunks comprising metadata indicating a type of post-processing to be performed on data within the data chunks, and with a sub-processor component of the active NVRAM component, performing (block 604) post-processing of the I/O data based on the metadata.

In conclusion, through use of methods and systems embodying principles described herein, the performance of I/O post-processing is increased. Specifically, use of the active NVRAM component relieves the main processing cores from the extra processing. The use of NVRAM also relieves the main processing core of moving the data across a network to special post processing nodes, thus avoiding data movement delays. Furthermore, the data is efficiently post-processed before being placed into a long-term persistent storage. Moreover, the active NVRAM provides an efficient checkpoint mechanism.

The preceding description has been presented to illustrate and describe examples of the principles described. This description is not intended to be exhaustive or to limit these principles to any precise form disclosed. Many modifications and variations are possible in light of the above teaching.

What is claimed is:
1. A computing node comprising:
an active Non-Volatile Random Access Memory (NVRAM) component comprising:

memory to store data chunks received from a processor core, said data chunks comprising metadata indicating a type of post-processing to be performed on data within said data chunks; and a sub-processor component to perform post-processing of said data chunks based on said metadata.

2. The computing node of claim 1, wherein said active NVRAM component comprises a module component communicatively coupled to said processor core.

3. The computing node of claim 1, wherein said computing node is one of multiple computing nodes also comprising an active NVRAM component, each of said multiple computing nodes acting in concert to execute a process.

4. The computing node of claim 3, wherein said process being executed by said multiple computing nodes is to assign an order identifier to data chunks.

5. The computing node of claim 4, wherein said sub-processor component is to process said data chunks within said memory in an order according to an active global queue.

6. The computing node of claim 5, wherein said active global queue reflects use of a balanced tree data structure to distribute processing of said data chunks across said multiple computing nodes.

7. The computing node of claim 1, wherein said post-processing comprises at least one of: data compression, indexing and data sorting.

8. A method for post-processing, the method comprising:
with a computing node, storing data chunks received from a processor core into a memory of an active Non-Volatile Random Access Memory (NVRAM) component, said data chunks comprising metadata indicating a type of post-processing to be performed on data within said data chunks; and with a sub-processor component of said active NVRAM component, performing post-processing of said data chunks based on said metadata.

9. The method of claim 8, wherein said active NVRAM component comprises a module component communicatively coupled to said processor core.

10. The method of claim 8, wherein said computing node is one of multiple computing nodes each comprising an active NVRAM component, each of said multiple computing nodes acting in concert to execute a process.

11. The method of claim 10, further comprising, with an application being executed by said multiple computing nodes, assigning an order identifier to data chunks.

12. The method of claim 11, further comprising, with said sub-processor component, processing said data chunks within said memory in an order according to an active global queue.

13. The method of claim 12, wherein said active global queue reflects use of a balanced tree data structure to distribute processing of said data chunks across said multiple computing nodes.

14. The method of claim 8, wherein said post-processing comprises at least one of: data compression and sorting.

15. A computing system comprising:
a number of computing nodes, each node comprising:
an active Non-Volatile Random Access Memory (NVRAM) component comprising:
memory to store Input/Output (I/O) data chunks received from a processor core, said data chunks comprising metadata indicating a type of post-processing to be performed on data within said data chunks; and
a sub-processor component to perform post-processing of said I/O data based on said metadata; and
a global active queue to use a balanced tree data structure to distribute processing of said data chunks across said number of computing nodes according to an order identifier assigned to said data chunks.

16. The computing node of claim 1, further comprising an output for connection to long-term persistent storage when said data chucks are stored following said post-processing.

17. The computing node of claim 1, further comprising a global queue, wherein said sub-processor is programmed to determine if a next data chunk to be post processed according to said global queue is within the memory of NVRAM component of the sub-processor and, if so, will fetch and post-process that data chunk according to the metadata of that data chunk.

18. The computing node of claim 1, wherein said memory receives said data chunks from said processor core using memory semantics rather than file semantics.

19. The computing node of claim 1, wherein the metadata indicates whether the data of the corresponding data chunk is to be sorted, reformatted or compressed and how the data of the corresponding data chunk is to be sorted, reformatted or compressed.

20. The computing node of claim 1, further comprising a locking mechanism to prevent conflicts if multiple processor cores attempt to write data to said NVRAM component.

* * * * *